United States Patent
Jones et al.

(10) Patent No.: US 9,578,868 B2
(45) Date of Patent: Feb. 28, 2017

(54) HIGH CLEARANCE ADJUSTABLE SPRAYER

(71) Applicant: Winfield Solutions, LLC, Shoreview, MN (US)

(72) Inventors: Matthew Jones, Primghar, IA (US); Steve Anthofer, Carroll, IA (US)

(73) Assignee: WINFIELD SOLUTIONS, LLC, Shoreview, MN (US)

( * ) Notice: Subject to any disclaimer, the term of this patent is extended or adjusted under 35 U.S.C. 154(b) by 360 days.

(21) Appl. No.: 13/954,714

(22) Filed: Jul. 30, 2013

(65) Prior Publication Data

US 2015/0034736 A1    Feb. 5, 2015

(51) Int. Cl.
*A01M 7/00* (2006.01)
*A01C 23/04* (2006.01)
*A01C 23/00* (2006.01)

(52) U.S. Cl.
CPC ........ *A01M 7/0053* (2013.01); *A01M 7/0014* (2013.01); *A01M 7/0082* (2013.01); *A01C 23/008* (2013.01); *A01C 23/047* (2013.01)

(58) Field of Classification Search
CPC . B05B 13/0221; A01C 23/047; A01C 23/008; A01M 7/005; A01M 7/006; A01M 7/0042; A01M 7/0053; A01M 7/0075; A01M 7/0082
USPC .................. 239/160, 164, 165, 169; 180/209
See application file for complete search history.

(56) References Cited

U.S. PATENT DOCUMENTS

| | | | | |
|---|---|---|---|---|
| 2,749,137 A | * | 6/1956 | Thomsen | A01D 75/28 180/209 |
| 3,236,324 A | * | 2/1966 | Levratto | B62D 49/0607 180/234 |
| 4,619,340 A | * | 10/1986 | Elmer | B60G 17/04 172/413 |
| 4,709,857 A | * | 12/1987 | Wilger | A01M 7/0075 239/164 |
| 4,739,930 A | | 4/1988 | Pask | |

(Continued)

FOREIGN PATENT DOCUMENTS

CN    2311121 Y    3/1999
CN    2731981 Y    10/2005

(Continued)

OTHER PUBLICATIONS

"High Ground Clearance", Farmers Guardian, Oct. 5, 2007, downloaded from http.//www.farmersguardian.com/high-ground-clearance/12555.article.

*Primary Examiner* — Arthur O Hall
*Assistant Examiner* — Joseph A Greenlund
(74) *Attorney, Agent, or Firm* — Dorsey & Whitney LLP (57) ABSTRACT

An agricultural sprayer assembly includes a wheeled carriage, a chassis, and a spray delivery system. The wheeled carriage has a number of adjustable support legs (e.g., four), each formed of hydraulically coupled and actuated upper and lower leg sections or members. The chassis is supported on the wheeled carriage, at an adjustable clearance height defined by the operational height of the support legs. The spray delivery system includes a spray boom coupled to a boom support, and an actuator coupled to the boom support and the chassis. The actuator is configured to adjust the height of the spray boom with respect to the clearance height of the chassis.

24 Claims, 8 Drawing Sheets

(56) References Cited

U.S. PATENT DOCUMENTS

| | | | | |
|---|---|---|---|---|
| 4,878,616 A * | 11/1989 | Richardson | ......... | A01M 7/0075 239/167 |
| 5,039,129 A * | 8/1991 | Balmer | ................... | B60G 3/04 180/209 |
| 5,046,579 A * | 9/1991 | Anderson | ............ | B60K 17/043 180/253 |
| 5,083,630 A | 1/1992 | Zaun | | |
| 5,597,172 A * | 1/1997 | Maiwald | ................. | B60G 3/00 280/124.153 |
| 5,755,382 A * | 5/1998 | Skotinkov | ............ | A01B 51/026 180/411 |
| 6,199,769 B1 * | 3/2001 | Weddle | ............. | B60G 17/0416 180/906 |
| 6,206,125 B1 * | 3/2001 | Weddle | ................ | B60B 35/001 180/209 |
| 6,371,237 B1 * | 4/2002 | Schaffer | ................ | B62K 11/02 180/219 |
| 6,386,554 B1 * | 5/2002 | Weddle | ................. | B60G 7/006 280/124.161 |
| 6,454,294 B1 * | 9/2002 | Bittner | ................ | A01B 51/026 180/68.4 |
| 7,669,675 B2 * | 3/2010 | Hagie | ................. | A01C 23/008 180/22 |
| 7,837,207 B2 * | 11/2010 | Kremmin | ............... | B60G 3/01 180/900 |
| 7,938,415 B2 * | 5/2011 | Carlson | ................... | B60G 9/02 280/124.11 |
| 8,205,893 B2 * | 6/2012 | Peterson | .............. | B60B 35/001 280/6.157 |
| 8,297,634 B2 * | 10/2012 | Bittner | .................. | B60G 21/06 180/209 |
| 8,376,078 B2 | 2/2013 | Hiddema | | |
| 8,424,881 B2 * | 4/2013 | Vander Zaag | ........ | A01B 63/22 280/43.17 |
| 8,453,947 B2 * | 6/2013 | Martin | ................... | A01B 63/16 239/163 |
| 8,602,137 B2 * | 12/2013 | Kroese | .................... | B60G 3/08 180/41 |
| 2002/0053795 A1 * | 5/2002 | Schaffer | .................. | B60G 3/01 280/830 |
| 2006/0011752 A1 | 1/2006 | Hiddema | | |
| 2010/0044980 A1 | 2/2010 | Kremmin et al. | | |
| 2011/0073026 A1 | 3/2011 | Martin et al. | | |
| 2011/0089647 A1 | 4/2011 | Peterson et al. | | |
| 2011/0133416 A1 | 6/2011 | Hiddema | | |

FOREIGN PATENT DOCUMENTS

| | | |
|---|---|---|
| CN | 2875068 Y | 3/2007 |
| CN | 201178644 Y | 1/2009 |
| CN | 201270734 Y | 7/2009 |
| CN | 201451133 U | 5/2010 |
| CN | 101856014 A | 10/2010 |
| CN | 201742839 U | 2/2011 |
| CN | 201758702 U | 3/2011 |
| CN | 201781887 U | 4/2011 |
| CN | 201797886 U | 4/2011 |
| CN | 202068856 U | 12/2011 |
| CN | 102342268 A | 2/2012 |
| CN | 202222311 U | 5/2012 |
| CN | 202354267 U | 8/2012 |
| CN | 102763634 A | 11/2012 |
| CN | 202588126 U | 12/2012 |
| CN | 202664074 U | 1/2013 |
| CN | 202664075 U | 1/2013 |
| CN | 202714114 U | 2/2013 |
| EP | 2382863 A1 | 11/2011 |
| EP | 2248690 B1 | 3/2013 |
| FR | 2810199 A1 | 12/2001 |
| GB | 2424630 A | 10/2006 |

* cited by examiner

HIGH CLEARANCE ADJUSTABLE SPRAYER

BACKGROUND

This disclosure is directed to wheeled spray delivery systems for use in agricultural applications, and specifically to high-clearance agricultural sprayers for use on corn and other tall grass crops. In particular, the disclosure relates to a wheeled, adjustable height agricultural sprayer adaptable to small plots and tall row crop applications, with an actuated boom system for improved spray control.

In farming and agricultural applications, sprayers are commonly used to apply a variety of different products including water, fertilizer, herbicides, pesticides and other fluid-based materials. Depending on application, crop sprayers come in a wide range of sizes and configurations, including portable backpack devices with hand-operated spray attachments, trailer-type sprayers with extended boom configurations, and aerial crop dusting systems for use in helicopters and fixed-wing aircraft.

Sprayer design depends upon crop configuration, growing environment, and the selected products to be applied. In particular, while some sprayer carriage and boom configurations may be adapted for different field crops such as corn, sorghum, wheat, and sunflowers, these configurations may or may not be appropriate for paddy crops like rice. Tubers and legumes can also require different sprayer designs, for example potatoes and soybeans, as compared to other row crops such as cotton and beets. Vine crops like tomatoes and grapes pose particular challenges for spray product application, as compared to tree crops like apples, oranges and nuts, as do other specialty crops like flowers, horticultural products, and nursery plots.

Across these different applications, speed and ease of use have been historical design drivers, along with product efficiency and efficacy. Spray drift and other loss effects are also important considerations, not only from a cost perspective, but also from the point of view of environmental protection and reduced human and animal exposure.

Based on all of these factors, there is an ongoing need for advanced sprayer designs and application techniques, with improved spray product delivery for a range of agricultural products with different crop heights, row configurations, and plot layouts. At the same time, there is also a desire for improved coverage and decreased application time, with reduced spray drift and risk of exposure.

SUMMARY

This disclosure is directed to a high clearance adjustable agricultural sprayer, for use with corn, tall grasses and other row and specialty crop applications. The sprayer includes a wheeled carriage, a chassis, and a spray delivery system. The carriage can have a number of adjustable support legs, for example four, each with hydraulically coupled upper and lower leg sections or members. The leg sections are hydraulically actuated, in order to define the clearance height of the chassis based on the operational height of the support legs and carriage.

The spray delivery system includes a spray boom coupled to a boom support, and an actuator coupled between the boom support and the chassis frame. The actuator can be operated to adjust the spray height of the spray boom with respect to the clearance height of the chassis.

In particular examples of this design, the lower leg sections can be coupled to individual wheel assemblies, while the upper leg sections support the chassis. Hydraulic cylinders can be positioned within the support legs, and configured to adjust the clearance height by hydraulically actuating the upper and lower leg members. For example, an (inverted) hydraulic cylinder can be positioned inside the upper leg member, with a hydraulic piston extending into the lower leg member, which in turn is nested inside the upper leg member, sliding in and out to adjust the clearance height in response to actuation of the hydraulic cylinder.

In some designs, a steering mechanism is configured to turn one or more of the support legs (e.g., the front pair), in order to control the wheeled carriage. One such mechanism includes a bearing assembly coupled to the chassis, with a rotating pin member coupled to the support leg. An actuator can then be used to steer the carriage by applying leverage to rotate the pin within the bearing, turning the leg and wheel assembly to determine the direction of motion. The wheels can be driven by hydraulic motors, for example using a four-wheel drive system with hydraulic coupling to an engine mounted on the chassis.

The clearance height is typically defined below the carriage height (that is, the operational height of the support legs), with the support legs extending above the chassis in order to increase stability and reduce mechanical stress on the carriage. A cab can also be supported on the chassis frame, with an operator station defined above the clearance height for improved visibility and control. The spray delivery system is typically rear-mounted, and the cab can positioned to place the operator's head above the spray height (that is, the height of the deployed spray booms), in order to reduce exposure.

In high clearance applications, each of the adjustable support legs may be foamed with separate hydraulically coupled and nested upper and lower sections, which are actuated to extend or retract the support legs. The chassis is typically supported on the upper leg sections, providing an adjustable clearance height defined below the carriage height.

The spray delivery system includes a spray boom coupled to a boom support, with an actuator configured to position the boom support above or below the clearance height of the chassis. An operator cab can also be provided, supported on the chassis with the operator station positioned above the clearance height, providing improved visibility as described above.

An internal hydraulic cylinder can be used to couple the upper and lower members of each support leg, with the carriage height defined by actuation of the internal cylinder. For example, the leg members may have substantially rectangular cross sections, with the lower section nested within the upper section. The hydraulic cylinder can be positioned within the upper leg section, in an inverted configuration with the piston extending into lower leg section.

A steering mechanism can be provided, using a pair of bearing assemblies coupled to the chassis. Each of the bearing assemblies has a pin member coupled to one of the front support legs, with a pair of actuators to steer the carriage by leveraged rotation of the pins within the bearings.

The clearance height of the sprayer chassis can typically be adjusted to at least six feet (or about 180 cm), or more, in order to apply product to a variety of row crops including soybeans and tall grass crops like corn, wheat and sorghum. The boom support and spray height can also be adjusted above or below the clearance height of the chassis, providing for precise control of the spray application, with easier access for maintenance, boom deployment, and storage.

In some applications, the clearance height can be as high as nine to ten feet, or about three meters or more, and the spray height may be as high as twelve feet, or about four meters or more. The cab can also be positioned to define the operator station below the height of the carriage; that is, with the operator's head normally positioned below the top of the support legs. This provides a combination of good visibility and spray control, without introducing undue instability or structural stress on the carriage.

The agricultural spray apparatus can also include a wheeled carriage with four adjustable support legs, each having a hydraulic cylinder positioned in the upper section, coupled to a hydraulic piston extending into the lower section. The chassis can then be supported by mechanical coupling to the upper leg sections, with an adjustable clearance height of at least six feet, or about 180 cm or more, as defined by actuation of the hydraulic cylinders inside the support legs.

An adjustable boom support can be coupled to the chassis, with a spray boom supported on the boom support. The boom support can then be actuated to define the spray height, which varies up or down with respect to the clearance height of the chassis.

A cab or operator station can be supported on the chassis, above the clearance height and with the operator's head positioned above the spray height. An engine can also be provided, and configured to drive the carriage by coupling to hydraulic motors in each of the wheel assemblies. The carriage can be steered using actuated bearing assemblies coupled to the chassis, which control the motion of the sprayer by turning the front pair of support legs in the desired direction of travel.

DETAILED DESCRIPTION

Figure 1:
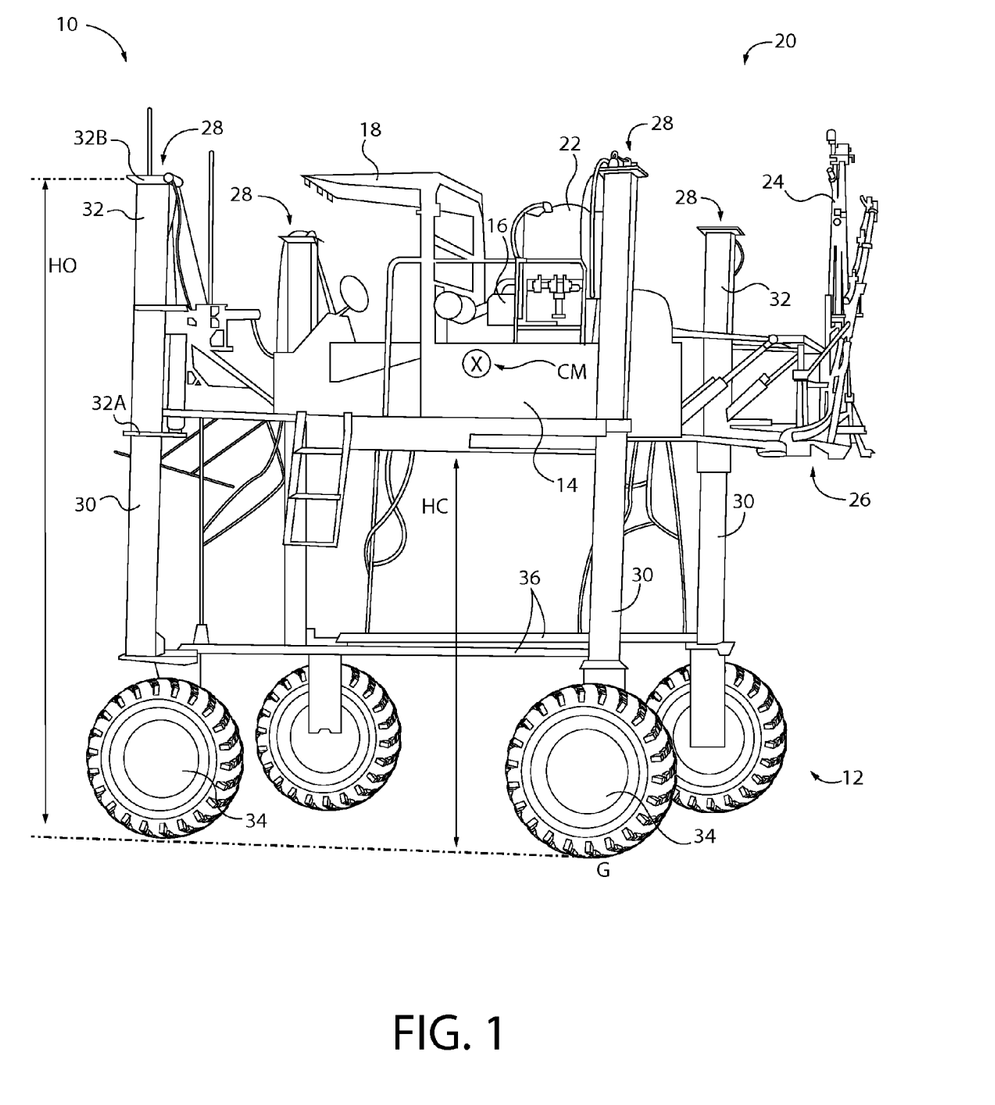
FIG. 1 is a side view of a high clearance agricultural sprayer.

FIG. 1 is a side view of a high clearance adjustable-height agricultural sprayer 10. As shown in FIG. 1, sprayer 10 includes a wheeled suspension or carriage 12 with adjustable height chassis or body section 14. Chassis 14 supports an engine inside engine compartment 16, along with operator cab 18 and spray delivery system 20. Delivery system 20 includes reservoir 22 and spray boom (or boom assembly) 24, for example as mounted on an adjustable boom support structure 26.

As shown in FIG. 1, chassis 14 is coupled to wheeled suspension or carriage 12 via a number of (e.g., four) adjustable height vertical supports or legs 28, each leg 28 having first and second hydraulically coupled support members or leg sections 30 and 32. First (lower) leg sections 30 are coupled to individual wheels (or wheel assemblies) 34, with longitudinal braces 36 extending between the lower front and rear legs 30 on each (e.g., left and right) side of wheeled carriage 12, for additional rigidity and structural support.

Chassis 14 is supported from carriage 36 by mounting to support legs 28 at the lower (bottom) portions 32A of second (upper) leg sections 32. Upper leg sections 32 are hydraulically coupled to lower leg sections 30, in order to adjust clearance height HC of chassis 14 with respect to ground level (G), for example using an internal hydraulic piston actuator arrangement, as described below.

Support legs 28 have overall operating height HO, as defined at top end 32B of upper leg sections 32. Operating height HO of support legs 28 is adjusted together with clearance height HC of chassis 14.

As shown in FIG. 1, engine compartment 16 and cab 18 are positioned above clearance height HC of chassis 14, and generally below operating height HO of support legs 28; that is, generally between lower (bottom) portion or end 32A and top end 32B of upper leg section or support leg member 32. This configuration provides sprayer 10 with increased stability and greater structural integrity for use in tall grass and other row and specialty crop applications, including over-the top tasseled corn and other crops with clearance heights HC of nine to ten feet (about three meters) or more, as described herein.

Sprayer 10 also positions the operator station (e.g., inside cab 18) above the clearance height (HC) of chassis 14, for increased visibility and improved operator control. In particular, while the top of cab 18 and un-deployed spray booms 24 may extend slightly above operating height H of support legs 28, the operator station (at operator eye or head level) is positioned substantially below operating height HO of support legs 28, between lower end 32A and top end 32B of upper leg section 32.

Figure 4:
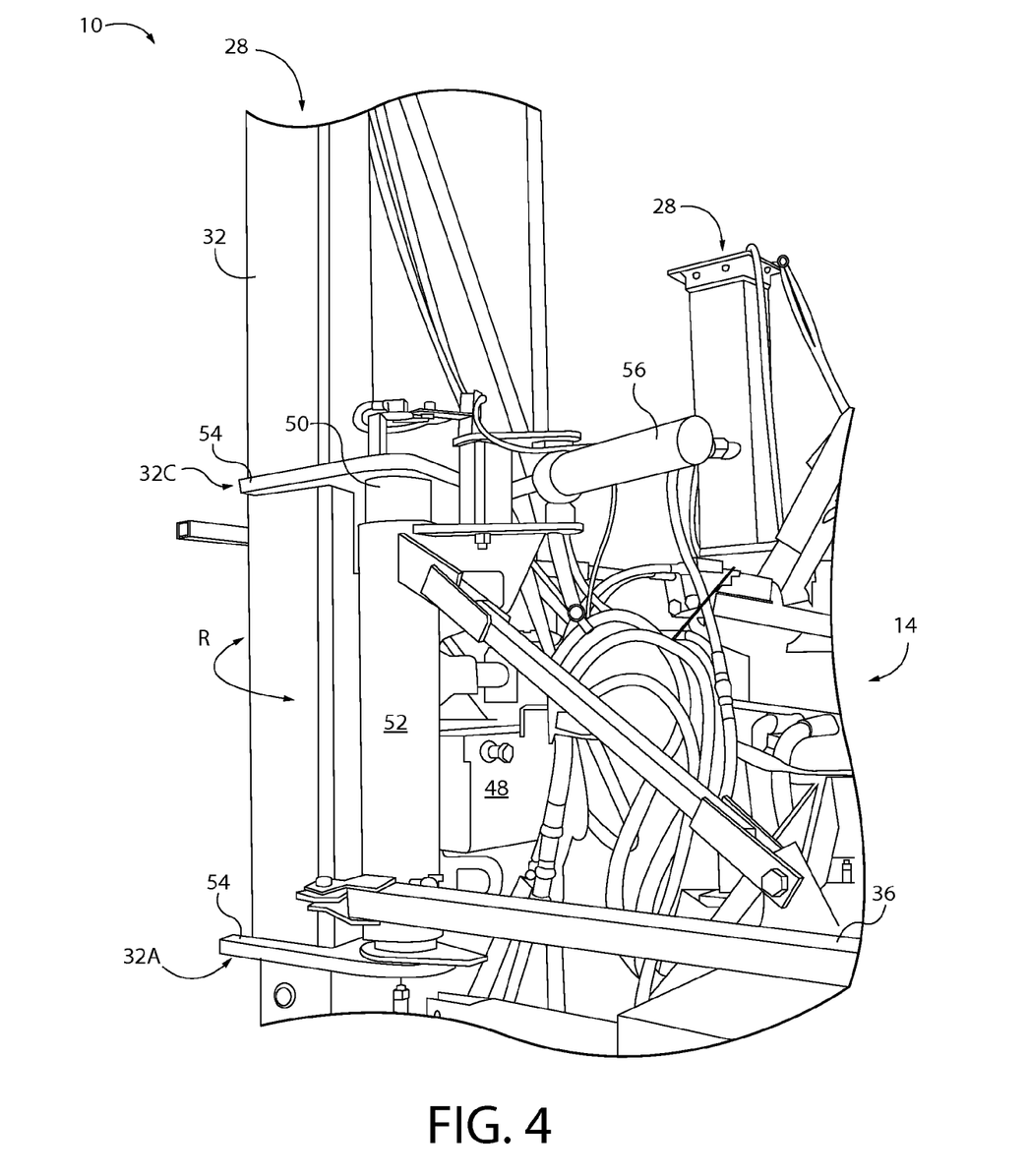
FIG. 4 is a detail view of a chassis coupling and steering mechanism for the agricultural sprayer of FIGS. 1-3.

The same is true for the center of mass (CM) of chassis section 14, including engine compartment 16, cab 18 and spray delivery system 20. In some designs, the center of mass (CM) may be positioned between lower end 32A and an approximate midpoint of upper support leg 32, between bottom (or lower) end 32A and top (or upper) end 32B (see, e.g. intermediate portion 32C of upper leg 32, as shown in FIG. 4).

At the same time, the operator station inside cab 18 is positioned above clearance height (CH) of chassis 14, with the operator head or eye level positioned above the spray height, when booms 24 are deployed. This provides increased stability and operator visibility, while decreasing the risk or level of exposure to spray products, as described below.

Figure 2:
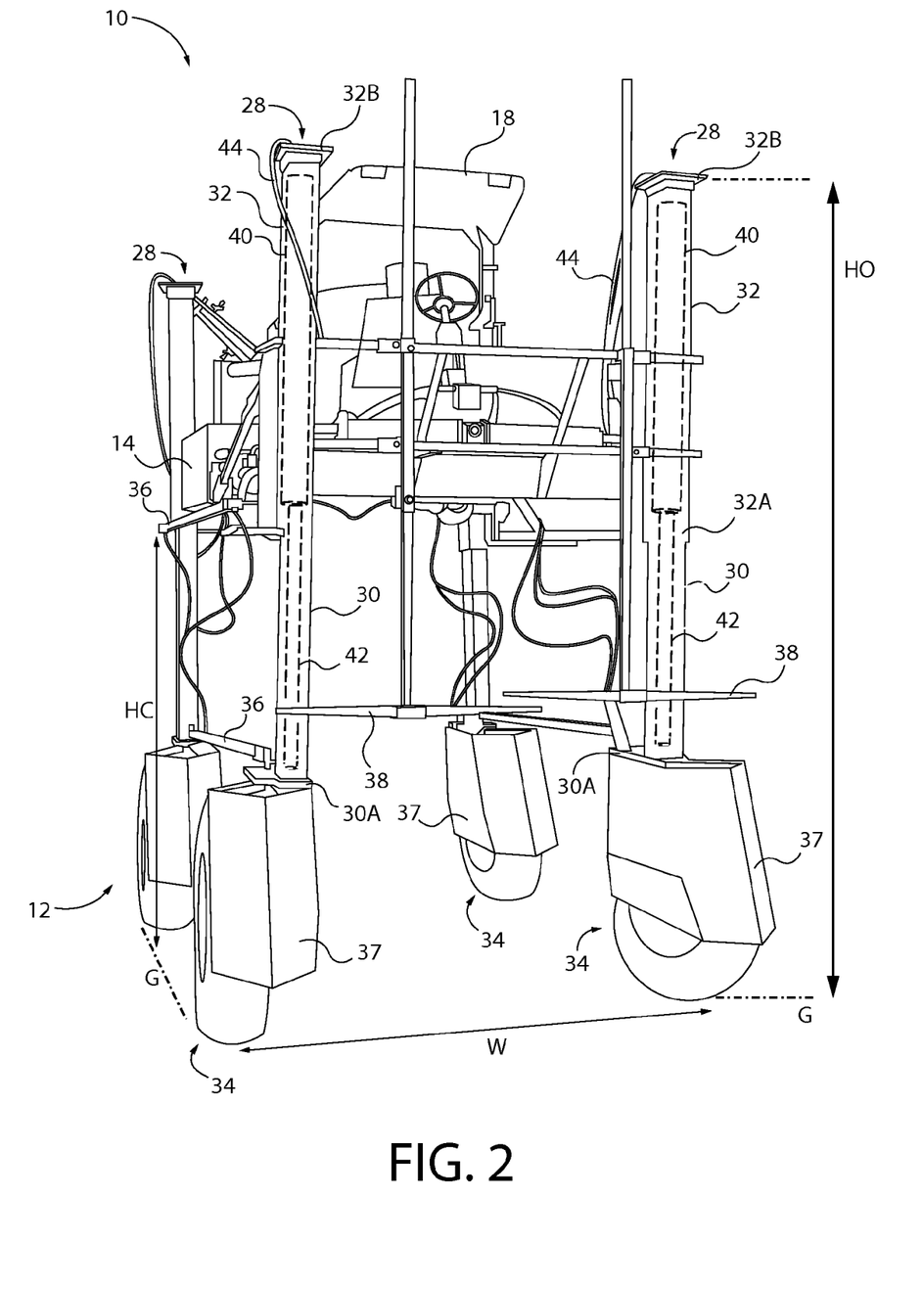
FIG. 2 is a perspective view of the sprayer, in an elevated configuration.

FIG. 2 is a perspective view of agricultural sprayer 10, with support legs 28 extended to position chassis 14 in an elevated position, at clearance height HC. Clearance height HC is defined between ground level G and the bottom of chassis 14, for example at longitudinal (side) brace 36, or along the bottom under-frame of chassis 14. One or more wheel assemblies 34 may be provided with wheel guards 37 to reduce crop damage during operation of sprayer 10, and row sensors (or feeler assemblies) 38 may be utilized to improve guidance and positioning, for example in combination with an auto-steer system for guiding or assisting operator control inside cab 18.

The operating height (HO) of each support leg 28 can be adjusted pneumatically, mechanically or hydraulically, for example via actuation of an internal hydraulic cylinder 40 and piston 42, as shown in FIG. 2 (dashed lines). In this particular design, support legs 28 have a substantially square or rectangular cross section, with lower leg section 30 nested within upper leg section 32. Pistons 42 are actuated by supplying hydraulic or pneumatic fluid to cylinders 40 via lines 44, causing lower leg sections 30 to slide in and out of upper leg sections 32 in order to adjust the operational height (HO) of each support leg 28, and to define the clearance height (HC) of chassis 14.

In additional designs, an inverted hydraulic cylinder 40 is provided each upper leg support 32, with hydraulic lines 44 extending through top end portions 32B. Hydraulic pistons 42 extend down from cylinders 40 through bottom end portions 32A of each upper leg section or support leg member 32, into the corresponding lower leg section or support leg member 30, proximate lower end or flange 30A at the coupling to wheel assembly 34. An upright cylinder configuration can also be utilized, and the internal coupling points may vary, depending on the geometry of upper and lower leg sections 30 and 32.

A similar width adjustment mechanism can also be provided, as described below, in order to adjust width W between wheel assemblies 34 based on a selected row or crop spacing. For example, wheel width W may be adjusted to accommodate one, two, three or more rows with a spacing of about twenty to thirty inches (about 50-75 cm), or anywhere from about fifteen inches to about thirty-eight inches (about 40 cm to about 1 m).

High-clearance sprayer 10 also provides operator cab 18 above clearance height HC, for example up to three meters (nine to ten feet) or more, and above the spray application height (or boom height), for example three to four meters (ten to twelve feet) or more. This increases operator visibility and control for high corn and other tall crop applications, while decreasing unwanted exposure as described above.

While these features provide sprayer 10 with substantial versatility for a range of tall row crops and other high-clearance agricultural applications, it also places substantial structural demands on wheeled carriage 12 and chassis 14. Enclosing hydraulic cylinder and piston systems 40 and 42 within support legs 28 substantially increases the structural integrity of wheeled carriage 12, reducing instability and stress at high clearance heights HC and greater wheel widths W.

Figure 3:
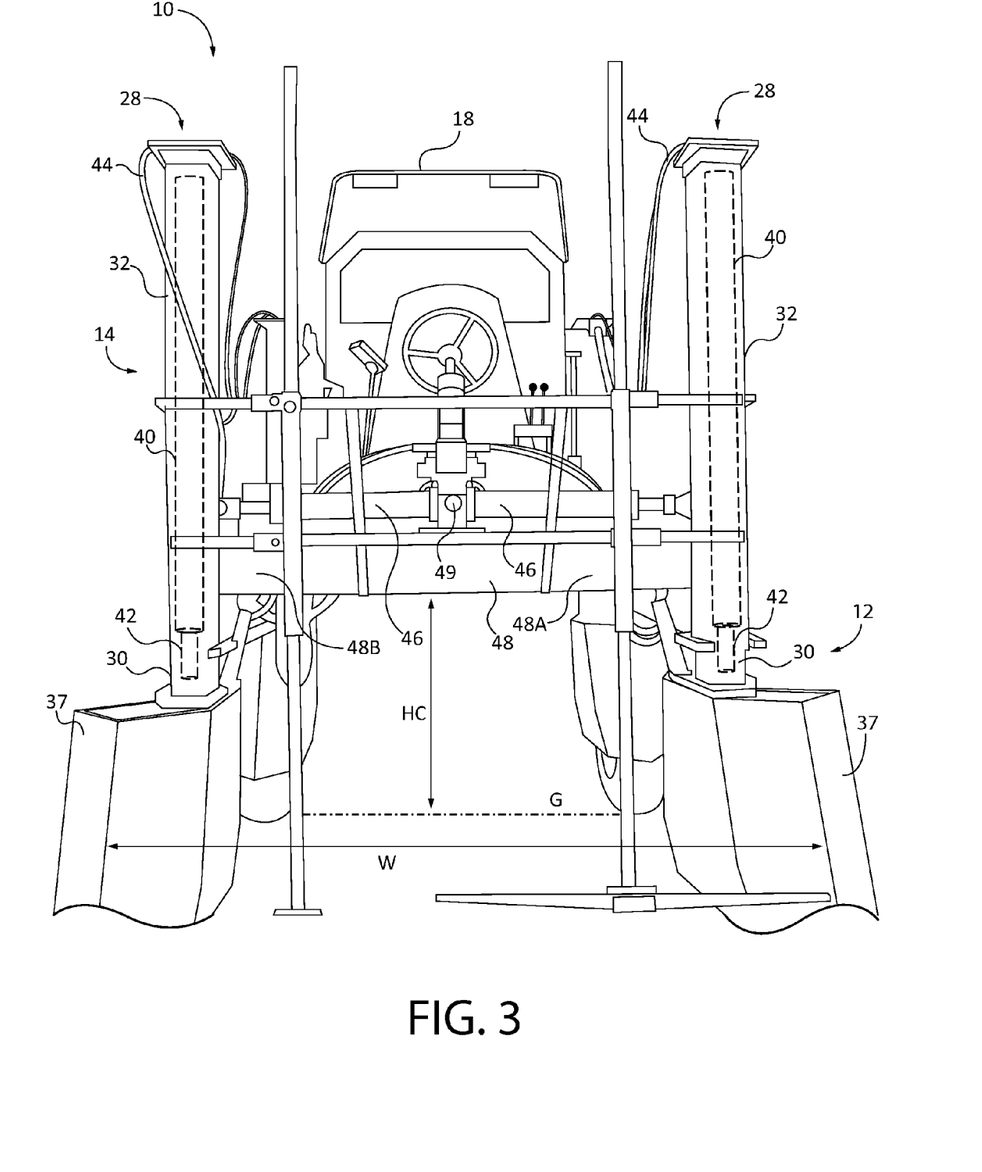
FIG. 3 is a front view of the prayer, in a lowered configuration.

FIG. 3 is a front view of agricultural sprayer 10, with support legs 28 retracted to position chassis 14 at clearance height HC, as defined between the underside of chassis 14 and ground level G. Clearance height HC of FIG. 3 is thus substantially smaller than in the elevated configuration of FIG. 2, with support legs 28 in an extended position. Here, hydraulic cylinder and piston systems 40 and 42 are actuated to slide upper leg sections 32 vertically down over substantially all of lower leg sections 32, with the bottom of upper support leg section 32 positioned near the top of wheel cover 37.

Wheel width W can be adjusted via hydraulic, mechanical, or pneumatic systems, as described above. As shown in FIG. 3, for example, one or more hydraulic cylinders 46 are coupled between opposite (left and right) support legs 28, at the front and rear of chassis 14. Hydraulic cylinders 46 are then be actuated to adjust wheel width W between left and right wheel assemblies 34 by increasing or decreasing the corresponding separation distance between support legs 28.

This configuration provides high-clearance sprayer 10 with independently adjustable wheel width W and clearance height HC, allowing for different row crop spacing even when lifted to clear up to nine-foot (2.75 m) tall tasseled corn and other tall grasses or specialty crops. Hydraulic width adjustment cylinders 46 can also be actuated to provide sprayer system 10 with a narrower transport envelope, for example when moving between fields.

In the particular configuration of FIG. 3, each horizontal support 48 includes two telescoping members 48A and 48B, which are coupled to upper sections 32 of left and right support legs 28, respectively, at the front and back of chassis 14. Opposing hydraulic cylinders 46 are coupled together utilizing a bracket or other coupling member 49, which may in turn be coupled to telescoping horizontal support 48 by welding or mechanical attachment to left or right telescoping support member 48A or 48B.

Hydraulic cylinders 46 extend between coupling bracket 49 and opposing upper sections 32 of left and right support legs 28, oriented generally parallel to telescoping members 48A and 48B of horizontal support 48. As hydraulic cylinders 46 are actuated, telescoping support members 48A and 48B extend in and out to adjust width W of sprayer system 10 between wheel assemblies 34.

The flexible design of sprayer 10 also provides for precise spray product applications to relatively small and closely-spaced research plots and other specialty agricultural areas, which were previously done by hand, or using aircraft-based systems. In particular, previous plot-by-plot methods involved walking through individual crop rows with a backpack sprayer and holding an overhead application boom, increasing user exposure without guaranteeing uniform application. Alternatively, aircraft-based application methods are typically directed to the whole field and are difficult to control on a plot-by-plot basis, both from an application quality point of view, and from an environmental perspective.

In addition, previous sprayer and lift kit systems do not provide the desired clearance and height control, in combination with the required stability, user protection and precision control necessary for advanced product research and development. Sprayer 10, in contrast, can be adapted to accurately apply products to any height corn, soybeans and other tall row or specialty crops, in a cost-effective, controlled and precise manner appropriate for agricultural research, and consistent with cost effective, environmental conscious farming and forward-thinking agricultural practices.

FIG. 4 is a detail view of a chassis coupling and steering mechanism for high clearance adjustable sprayer 10. As shown in FIG. 4, upper section 32 of support leg 28 is coupled to rotating pin 50 and bushing or bearing assembly 52, for example by welding to flanges 54. Flanges 54 may be provided at various locations along upper support leg 32, for example at bottom end 32A and in intermediate portion 32C of upper leg 32, between bottom end 32A and the top of support leg 28.

Chassis 14 is supported by (front) horizontal support 48, which is coupled to upper leg section 32 via bearing assembly 52. This allows support leg 28 to rotate or turn (e.g., left and right, see arrow R) with respect to chassis 14, in response to actuation by a hydraulic cylinder or other steering actuator mechanism 56.

Figure 5:
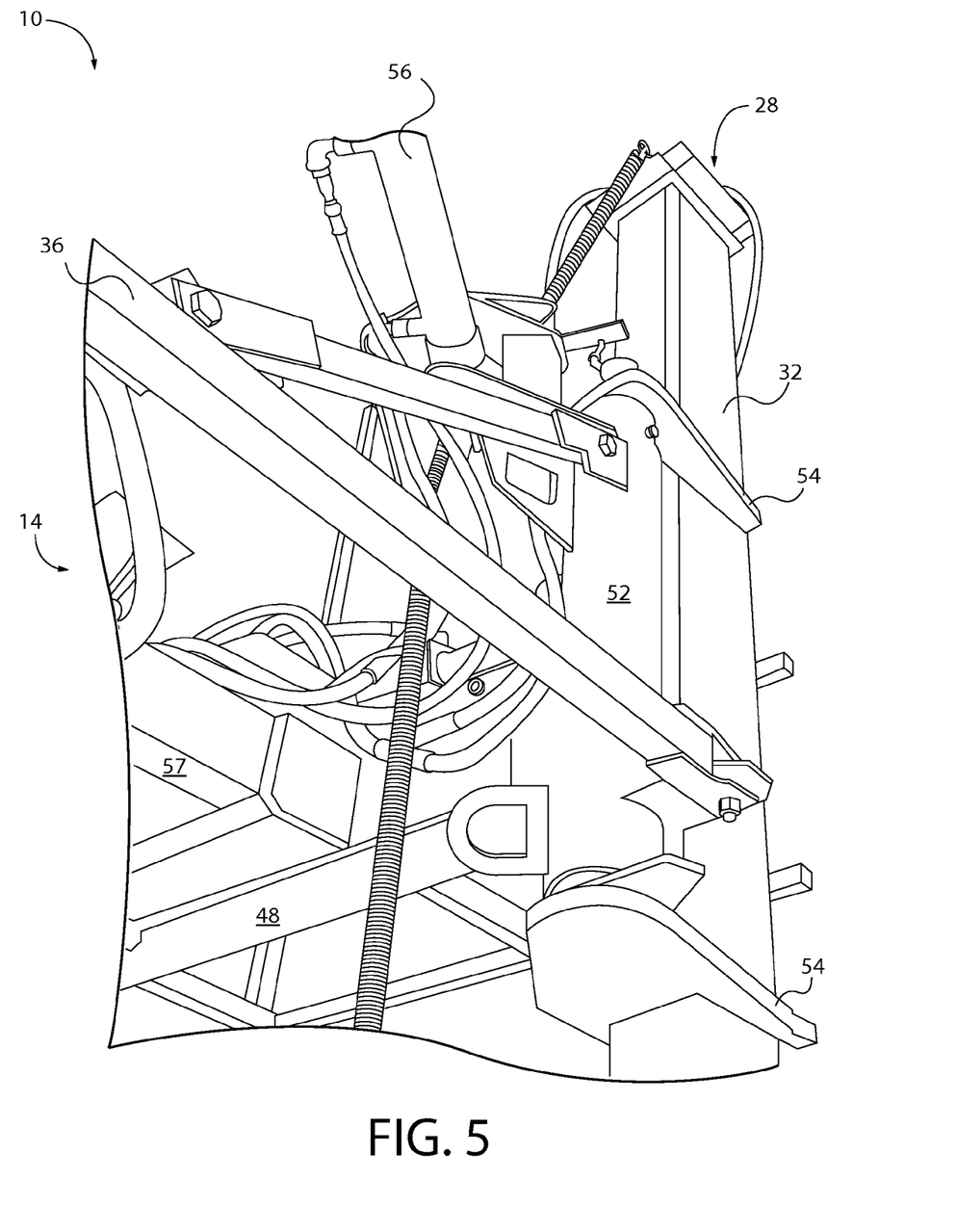
FIG. 5 is an underside view of the chassis coupling and steering mechanism.

FIG. 5 is an underside view of the chassis coupling and steering mechanism, showing the coupling between chassis 14 and front horizontal support 48. For example, chassis 14 can be supported on an under-frame or other support structure 57, as shown in the figure, and frame 57 can be attached to front (and rear) horizontal supports 48 by welding, bolts, or other mechanical means.

Steering is accomplished by actuating steering hydraulics 56 to rotate support leg 28 left and right with respect to chassis 14, as described above. One or more longitudinal braces 36 can be coupled to the stationary portion of bearing assembly 52, for example utilizing a two-point bolted connection as shown. This allows support legs 28 to turn back and forth independently of chassis 14, providing independent steering (directional) and lift (clearance) control.

Figure 6:
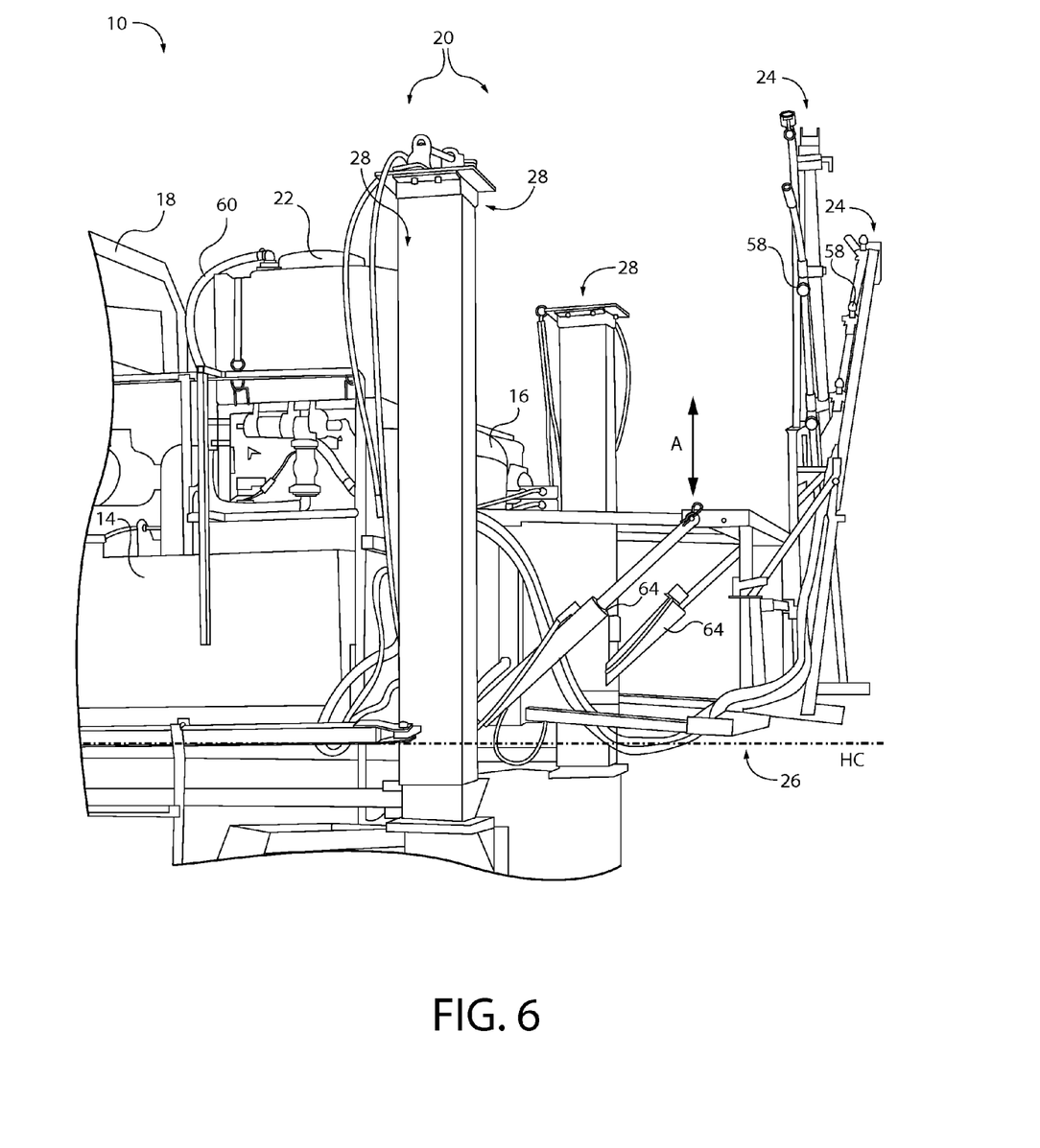
FIG. 6 is a side view of a spray delivery system for a high clearance agricultural sprayer.

FIG. 6 is a side view of spray delivery system 20 for adjustable height agricultural sprayer 10. Delivery system 20 includes reservoir 22 and spray boom assembly 24, which is mounted on an adjustable boom support 26, as described above. Reservoir 22 is provided in fluid communication with spray outlets 58 on spray booms 24, for example using one or more spray product flow lines 60.

Reservoir 22 is typically formed of plastic, metal, or another material with suitable durability and chemical properties, according to the desired spray product application. In one particular example, a relatively low-volume fluid reservoir 22 may be utilized, as selected for small test plot applications. Alternatively, a larger chassis-mounted reservoir 22 can be used, or a towed trailer or tank type reservoir may be provided.

Spray booms 24 are shown in a vertical folded or stowed configuration. In operation of sprayer (or spray apparatus) 10, booms 24 are typically unfolded for deployment into a horizontal configuration, with spray outlets 58 directed downward toward the desired crop application, or in an upward or outward direction, as desired. Spray outlets 58 thus define the spray height of delivery system 20, either with spray booms 24 deployed in a standard horizontal configuration, or in any other desired arrangement.

Adjustable boom support 26 can be positioned in an upward or downward direction (arrow A) with respect to clearance height HC of chassis 14, for example via actuation of hydraulic cylinders 64, or via a similar pneumatic or mechanical actuator. In particular, boom support 26 can be independently actuated to deploy spray booms 24 above or below clearance height HC of chassis 14, providing for fine adjustment of the spray boom and application height during operation of sprayer 10, without necessarily changing the clearance height of chassis 14.

Boom support 26 can also be actuated to lower spray booms 24 below the clearance height of chassis 14, for example when support legs 28 are in a retraced position, as shown in FIG. 6. This provides for easier maintenance access, and allows for manual deployment and stowage when spray booms 24 are not otherwise be easily accessible from ground level, for example with clearance heights HC exceeding a few feet (e.g., a meter or more), even when legs 28 are fully retracted and chassis 14 is in the fully lowered position.

Figure 7:
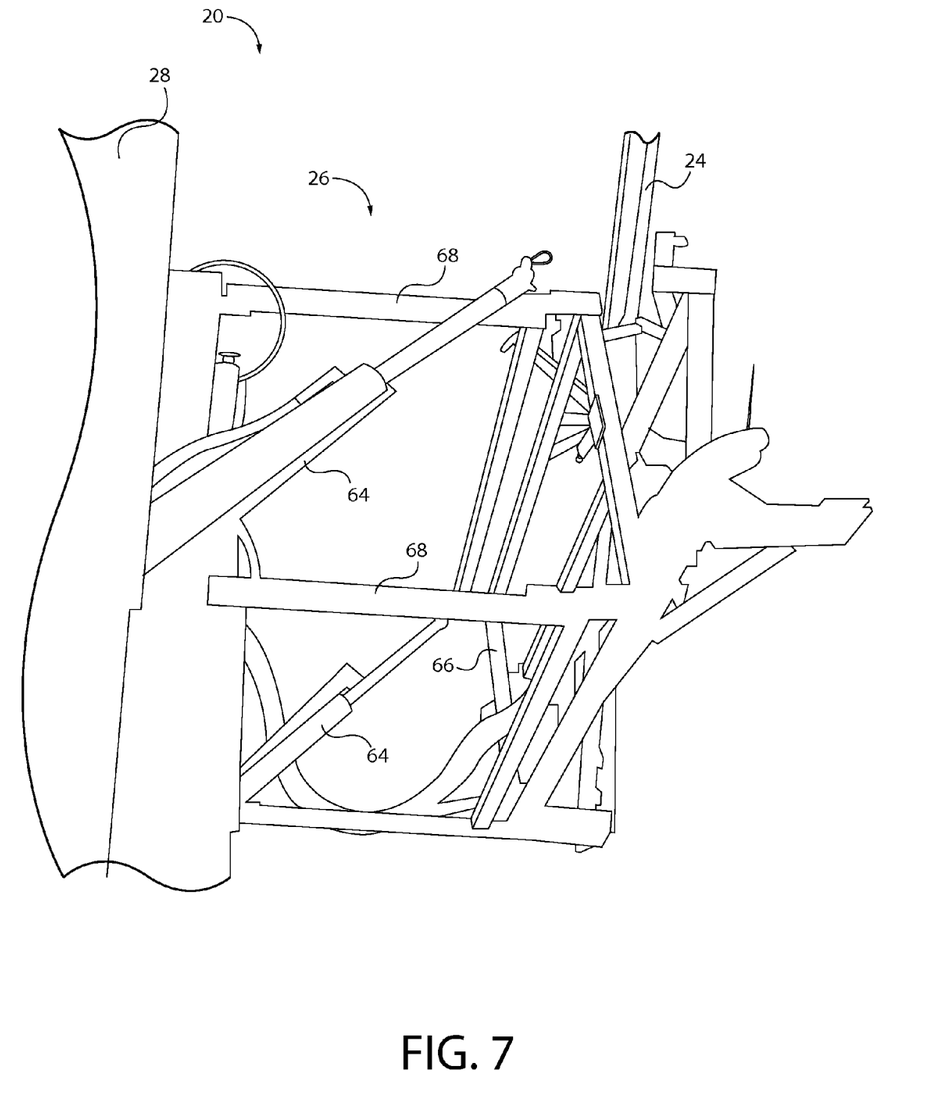
FIG. 7 is an underside view of an adjustable spray boom assembly for the spray delivery system.

FIG. 7 is an underside view of adjustable spray boom support 26 for spray delivery system 20. As shown in FIG. 7, boom support 26 may have a substantially boxlike configuration, with spray booms 24 supported on one or more substantially vertical boom support members 66, and vertical support members 66 supported by one or more longitudinal support members 68. Longitudinal support members 68 are deployable in raised, lowered, or substantially horizontal positions with respect to vertical support legs 28, for example by actuation of hydraulic cylinder and piston systems 64, as described above, with support legs 28 in either an extended (raised) or retracted (lowered) position.

Figure 8:
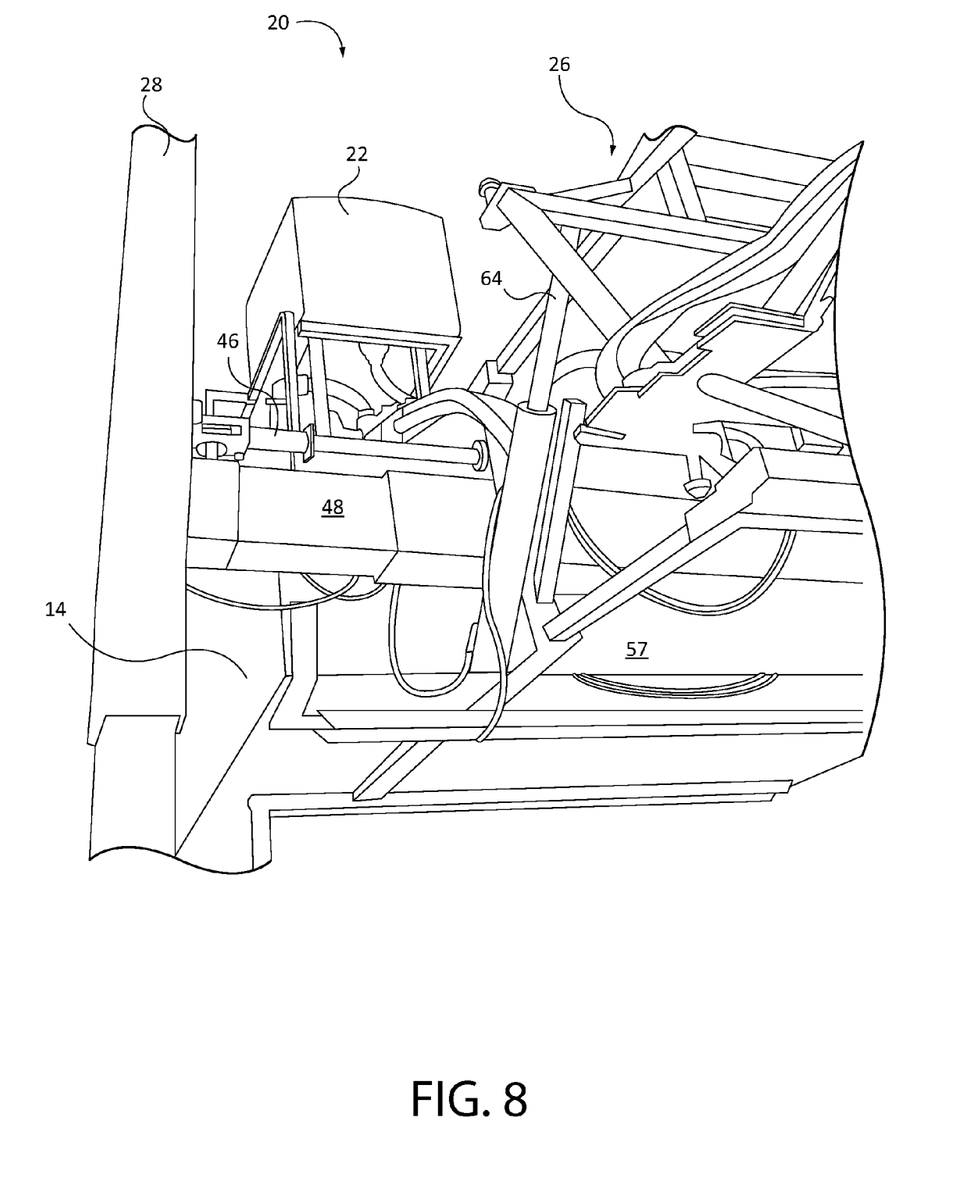
FIG. 8 is a detail view of the spray delivery system, showing the adjustable spray boom mechanism.

FIG. 8 is a detail view of spray delivery system 20, showing the adjustable spray boom mechanism. As shown in FIG. 8, a hydraulic cylinder and piston or other actuator mechanism 64 can be used to raise and lower boom support 26 with respect to (rear) horizontal support 48, either for maintenance and deployment purposes, or to adjust the boom height (or spray application height) above or below the clearance height of chassis 14 and under frame 57.

Rear support legs 28 may also incorporate an adjustable with mechanism, for example utilizing a hydraulic piston or other actuator 46, as described above with respect to the front-end chassis support structure of FIG. 3. In the rear of chassis 14, however, under-frame 57 and horizontal support 48 may be directly coupled to adjacent support legs 28, which are rotationally fixed with respect to chassis 14. Alternatively, a four-wheel steerable leg configuration may be provided, for example utilizing additional rotating pin and bearing assemblies 50 and 52.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

The invention claimed is:

1. An agricultural sprayer comprising:
   a wheeled carriage having adjustable support legs, each of the support legs comprising hydraulically coupled leg sections defining an adjustable carriage height, wherein an operational height of the support legs is defined between a ground surface and a top end of each of the support legs;
   a chassis supported in part by the wheeled carriage, the chassis having an adjustable clearance height defined by adjusting the carriage height;
   a cab supported on the chassis, the cab defining an operator station positioned above the clearance height and below the operational height of the support legs;
   a spray delivery system coupled to the chassis, the spray delivery system comprising a spray boom supported on a boom support and an actuator coupled thereto, wherein the actuator is configured to actuate the boom support in order to adjust a boom height of the spray boom with respect to the clearance height of the chassis.

2. The sprayer of claim 1, wherein the hydraulically coupled leg sections comprise a lower leg section coupled to a wheel assembly and an upper leg section coupled to the chassis.

3. The sprayer of claim 2, further comprising a hydraulic cylinder positioned within at least one of the support legs, wherein the hydraulic cylinder is configured to adjust the clearance height of the chassis by hydraulically actuating the upper and lower leg sections.

4. The sprayer of claim 3, wherein the hydraulic cylinder is positioned inside the upper leg section and further comprising a hydraulic piston coupled to the hydraulic cylinder and extending into the lower leg section.

5. The sprayer of claim 1, further comprising a steering mechanism configured to turn one or more of the support legs with respect to the chassis.

6. The sprayer of claim 5, wherein the steering mechanism comprises a bearing assembly coupled to the chassis, the bearing assembly comprising a rotating pin member coupled to the one or more support legs.

7. The sprayer of claim 1, wherein the clearance height of the chassis is defined below the carriage height.

8. The sprayer of claim 1, wherein the operator station is located above a spray height defined by deployment of the spray booms.

9. The sprayer of claim 1, wherein the clearance height is at least six feet (or at least about 180 cm), and wherein the spray height is greater than the clearance height.

10. A high clearance sprayer comprising:
a wheeled carriage having a plurality of adjustable support legs, each of the support legs comprising upper and lower hydraulically coupled leg members, wherein an operational height of the support legs is defined between a ground surface and a top end of each of the upper leg members;
a chassis supported in part by the upper leg members, the chassis having an adjustable clearance height defined below the operational height of the support legs;
an operator cab supported on the chassis, the operator cab defining an operator station positioned above the clearance height and below the operational height of the support legs;
a spray delivery system supported on the chassis, the spray delivery system comprising a spray boom coupled to a boom support and an actuator configured to position the boom support above and below the clearance height of the chassis.

11. The high clearance sprayer of claim 10, further comprising an internal hydraulic cylinder coupling the upper leg member of each support leg to the lower leg member thereof, wherein the internal hydraulic cylinder is actuated to define the operational height of the support legs.

12. The high clearance sprayer of claim 11, wherein the lower leg member comprises a substantially rectangular cross section nested within a corresponding substantially rectangular cross section of the upper leg member.

13. The high clearance sprayer of claim 12, wherein the internal hydraulic cylinder extends within the substantially rectangular cross section of the upper leg member and further comprising a hydraulic piston coupled to the internal hydraulic cylinder, the hydraulic piston extending within the substantially rectangular cross section of the lower leg member.

14. The high clearance sprayer of claim 11, further comprising a steering mechanism configured to turn a pair of the support legs with respect to the chassis.

15. The high clearance sprayer of claim 14, wherein the steering mechanism comprises a pair of bearing assemblies coupled to the chassis, each of the bearing assemblies having a pin member coupled to one of the pair of support legs, and further comprising a pair of actuators configured to turn the pair of support legs by leveraged rotation of the pins within the bearing assemblies.

16. The high clearance sprayer of claim 10, wherein the operator station is defined above a spray height of the spray booms, wherein the spray height is defined between the ground surface and the spray booms.

17. The high clearance sprayer of claim 10, wherein the clearance height is at least six feet (or at least about 180 cm).

18. An apparatus comprising:
a wheeled carriage with four adjustable support legs, each of the support legs comprising a lower leg member coupled to a wheel assembly and an upper leg member having a hydraulic cylinder positioned therein, the hydraulic cylinder comprising a hydraulic piston coupled to the lower leg member, wherein an operational height of the support legs is defined between a ground surface and a top end of each of the upper leg members;
a chassis supported in part by the wheeled carriage by mechanical coupling to the upper leg members at an adjustable clearance height of at least six feet (or about 180 cm), wherein the adjustable clearance height is defined by actuation of the hydraulic cylinders;
an adjustable boom support coupled to the chassis and a spray boom supported thereon, wherein the boom support is actuated to define a spray height of the spray boom with respect to the clearance height of the chassis;
an operator station supported on the chassis, wherein the operator station is positioned below the operational height of the support legs and above the spray height defined by the spray boom.

19. The apparatus of claim 18, further comprising:
an engine supported on the chassis, wherein the engine is configured to drive each of the wheel assemblies by hydraulic coupling thereto; and
a pair of actuated bearing assemblies coupled to the chassis, the bearing assemblies configured to steer the wheeled carriage by turning a front pair of the support legs.

20. The agricultural sprayer of claim 1, wherein the spray boom is movable independent of the chassis.

21. The agricultural sprayer of claim 1, wherein the actuator coupled to the spray boom includes one or more hydraulic cylinders for adjusting the spray boom relative to the chassis.

22. The agricultural sprayer of claim 1, wherein a variation of the operational height of the support legs varies the clearance height of the chassis.

23. The agricultural sprayer of claim 1, wherein the operator station defines an enclosure having a volume sufficient to house at least one operator.

24. The agricultural sprayer of claim 1, wherein the operational height of the support legs is positioned at or above a top surface of the cab.

* * * * *

UNITED STATES PATENT AND TRADEMARK OFFICE
CERTIFICATE OF CORRECTION

PATENT NO.        : 9,578,868 B2
APPLICATION NO.   : 13/954714
DATED             : February 28, 2017
INVENTOR(S)       : Jones et al.

It is certified that error appears in the above-identified patent and that said Letters Patent is hereby corrected as shown below:

In the Specification

| Column | Line | Delete | Insert |
|--------|------|--------|--------|
| 2 | 33 | "support legs may be foamed" | -- support legs may be formed -- |

Signed and Sealed this
Second Day of May, 2017

Michelle K. Lee
*Director of the United States Patent and Trademark Office*